Nov. 11, 1930.   L. B. GREEN   1,781,173
FRICTION CLUTCH
Original Filed March 25, 1927

INVENTOR
Lee B. Green
BY
Kwis Hudson & Kent
ATTORNEYS

Patented Nov. 11, 1930

1,781,173

UNITED STATES PATENT OFFICE

LEE B. GREEN, OF LAKEWOOD, OHIO, ASSIGNOR TO THE BORDEN COMPANY, OF WARREN, OHIO, A CORPORATION OF OHIO

FRICTION CLUTCH

Original application filed March 25, 1927, Serial No. 178,242, now Patent No. 1,772,863, dated August 12, 1930. Divided and this application filed July 12, 1928. Serial No. 292,103.

This invention relates to a friction clutch mechanism.

The clutch mechanism constructed in accordance with the invention will be herein illustrated and described in connection with a centrifugal drier such as is disclosed in my copending application Serial No. 178,242, patented August 12, 1930; No. 1,772,863, and of which this application is a division. It should be understood, however, that the clutch mechanism of the present invention is not limited in its use to a centrifugal drier but is susceptible of being used in various relationships and in various devices wherever it is desirable to connect a driving member with a driven member.

An object of the present invention is to provide a clutch mechanism which will permit of slippage between the driving member and driven member during starting of the device with which it is used, or upon overloading of the driven member so that the driving means or motor for the driving member will not be overloaded at such times.

Another object is to provide a clutch mechanism capable of withstanding wear.

Another object is to provide a clutch mechanism which is readily adjustable to compensate for wear.

Another object is to provide a clutch mechanism capable of accomplishing the foregoing objects which is of simple and economical construction.

Additional objects and advantages will become apparent as the description of the invention proceeds.

Figure 1:
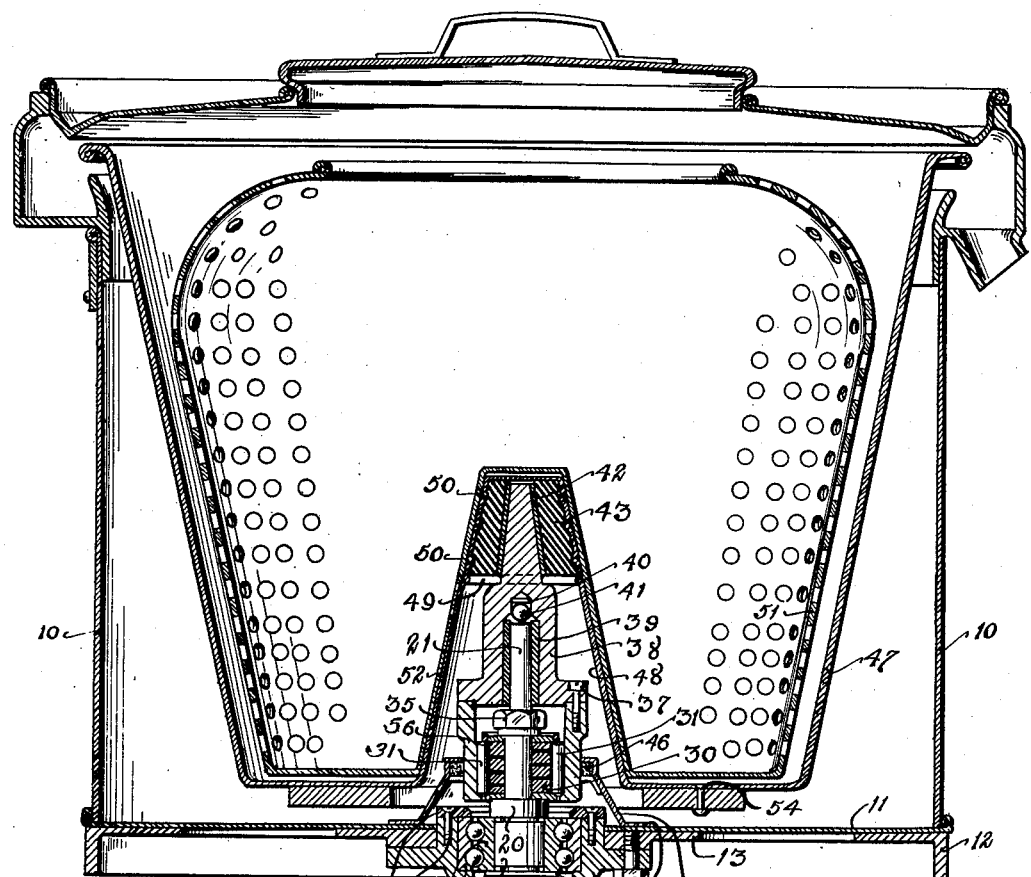
Figure 2:
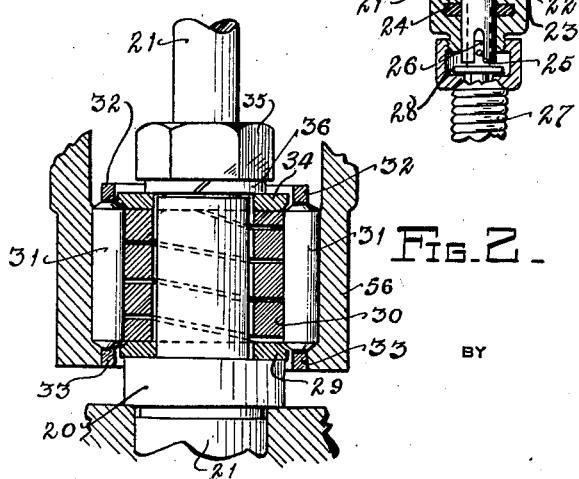

An embodiment of the invention is illustrated in the accompanying drawing wherein Fig. 1 is a vertical sectional view of a centrifugal clothes drier, the clutch mechanism being shown as coupling the driving and driven portions of the drier; and Fig. 2 is a fragmentary detail view showing the clutch mechanism on a larger scale than in Fig. 1.

Although a clutch mechanism according to the present invention is adaptable for use with various forms of devices wherein there are driving and driven members, it is herein shown and described as being employed in a centrifugal clothes drier, such illustration and description, however, being purely by way of example and intended merely to set forth one particular application and use of the invention.

Referring particularly to Figs. 1 and 2, the casing of the machine, which may be generally cylindrical, has a side wall 10 of sheet metal with a bottom 11 of the same material provided with a central opening. The bottom of the casing may have suitable reinforcements such as a peripheral element 12 and a ring 13 surrounding the opening in the bottom of the casing. The ring 13 has secured thereto by a plurality of machine screws 14 a bearing supporting casting 15. The casting 15 is internally shouldered to support the outer race 16 of a radial and thrust ball bearing, the outer race being held to the shoulder by a ring 17, which is secured to the casting by screws 18. The inner race of this bearing abuts against an enlargement 20 on a shaft 21, being held in position by a washer and nut 22 and 23, respectively, the nut being threaded on the shaft 21. Packing rings 24 are mounted on the lower part of the casting 15 to prevent the escape of lubricating oil. The shaft 21 extends downwardly out of the casting 15 and at its lower end has provision for connection with some driving means which, in the drawings, takes the form of a flexible shaft 25 having a driving pin 25' working in a slot 26 in the shaft 21. Next above the enlargement 20 of the shaft 21 is a washer 29 which supports the lower end of a spiral spring 30 formed of wire of square cross-section which is ground to an accurate measurement on its outer surface and constitutes the inner race of a roller clutch, two of the rollers of which are shown at 31. The rollers 31 are mounted in a cage, the upper and lower portions of which are shown at 32 and 33 respectively. Above the spring 30 is a second washer 34 which may be caused to compress the spring 30, a nut 35 with a lock washer 36 being employed for this purpose, the nut 35 being threaded upon the reduced upper end of the shaft 21. By increasing the compression of the spring 30 its diameter may be increased whereby the friction in the roller clutch is varied and controlled. The outer race 56 of the roller clutch is extended upwardly to form an enclosure for the nut 35 and its upper end has attached thereto by screws 37, or the like, a casting 38 which is centrally bored to receive a bushing 39 fitting the shaft 21 and counterbored to receive a steel bearing disk 40 and a steel ball 41, these latter parts transmitting end thrust to the shaft 21, the rollers 31 taking radial thrust only. The upper end of the casting 38 is tapered slightly to receive with a tight sliding fit a tapered sleeve 42 upon which is mounted an annular block 43 of soft rubber. An annular sheet metal element 44 has a flange 45 at the bottom thereof which is welded or otherwise secured to the bottom 11 of the machine casing, while at its upper end the element 44 carries a packing ring 46 thus enclosing the rotating parts and preventing the discharge of lubricating oil.

From the description thus far set forth it should be observed that considering the invention in its broad aspects the shaft 21 represents the driving member while the casting 38 and the outer race 56 represent the driven member, the coil spring 30 and the rollers 31 forming a friction clutch or coupling between such driving and driven members. Of course the driven or rotating portions of the centrifugal drier disclosed in the present embodiment also form, in this specific instance, a part of the driven member. These portions may be briefly described as comprising a clothes container of two parts, one of which is an outer vessel 47 having a central upstanding and preferably conoidal portion 48 provided with a bead 49 in its wall adapted to abut against the lower end of the block 43 and having a series of small rounded projections 50 that take into the rubber of the block 43 so that a good driving connection results. The closed upper end of the upstanding portion 48 may rest upon the upper end of the block 43. The other part of the container is a perforated disk 51 also preferably provided with a central upstanding portion 52 of conoidal form which rests upon the upstanding portion 48 of the outer vessel and has a frictional engagement therewith so that rotation imparted to the outer vessel 47 is transmitted to the basket 51.

It is not thought to be necessary to describe or specifically set forth further details of the centrifugal drier since sufficient have already been enumerated to fully explain the operation of the clutch mechanism and its relation to the particular device with which it is used in the present embodiment. The further details of the centrifugal drier and the advantages resulting therefrom are fully set forth in my co-pending application above mentioned and, therefore, will not now be repeated.

In operation, the spring 30 is adjusted by expansion and contraction of its diameter through an adjustment of the compression exerted thereon by the washer 36 and nut 35. It will be observed that the coils of the spring stand at an angle to the horizontal, that is assuming that the shaft 21 is a vertical shaft. When the spring is compressed, the angularity of these coils is lessened, that is they are brought toward the horizontal, tilted upon horizontal axes, as it were. Hence, while their diameters may not necessarily be increased, these diameters are brought more nearly into perpendicular relation with the rollers 31, and the springs are thereby forced outwardly against those rollers. It should be understood that this action is a minute one only, as the rollers and the outer surfaces of the spring are accurately finished and an extremely small adjustment is sufficient to vary considerably the amount of friction to which the rollers are subjected. This adjustment naturally varies the points at which slippage will occur in the clutch mechanism upon the starting of the device or upon the overloading of the same and will differ in accordance with the different uses and relationships in which the clutch mechanism is employed. When the driving motor or other source of power is set in operation, and the driving shaft 21 commences to rotate, the spring 30 rotates with it, being clamped between the collar 20 and nut 35. The outer race 56 of the roller bearing, and the parts secured thereto, possess considerable inertia. This inertia at the start is of greater effect than the friction in the roller bearing. Hence the rollers 31 are rotated by the spring 30 and caused to roll upon the race 56. At the same time, however, the friction between the rollers 31 and the race 56 tends to produce rotation in the latter, and this tendency gradually builds up until the race 56 with its associated parts begins to rotate. Friction acting thereafter in the same manner gradually increases the speed of rotation of the driven parts until it may nearly, if not quite, equal the speed of the shaft 21, at which time, of course, the rollers 31 have no rotation upon their own axes. In the same way should an overload be placed upon the driven member a slippage will immediately take place in the clutch mechanism, thereby allowing the driving member to rotate or be operated without an overloading of the source of power or driving motor.

The adjustment feature already set forth permits the clutch and the degree of slippage to be accurately adjusted in accordance with the conditions to which the mechanism is to be subjected and also to take up whatever wear might occur between the parts of the clutch mechanism. However, this last feature of adjustment will probably never be necessary or, if necessary, only at rare intervals since every element of the clutch mechanism is a metallic member and, therefore, not readily subject to wear.

Although a preferred embodiment of the invention has been illustrated and described herein it should be understood that the same is not to be limited thereto but is susceptible of various modifications and adaptations falling within the scope of the appended claims.

Having thus described my invention, I claim:

1. In a clutch mechanism, a driving member, a driven member and a coupling therebetween, said coupling comprising a roller bearing, a spiral spring associated with one of said members and forming one of the races for said bearing, means associated with the other of said members and forming the other race for said bearing, and means for compressing said spring endwise to a greater or lesser extent for varying the effective diameter of the race of the bearing formed thereby and thus regulating the amount of friction in said bearing.

2. In a clutch mechanism, a driving member, a driven member and a coupling therebetween, said coupling comprising a roller bearing, a spiral spring associated with the driving member and forming the inner race of the bearing, means associated with the driven member and forming the outer race of the bearing, and means for compressing said spring endwise to a greater or lesser extent for varying the effective diameter of the inner race of the bearing and thereby regulating the amount of friction in said bearing.

3. In combination, a driving mechanism including a shaft, and a friction clutch therefor comprising a roller bearing for the shaft, the inner race of said bearing having a spiral spring, a shoulder on the shaft against which said springs bears at one end and a nut therefor on the shaft for applying pressure on the other end of said spring whereby the effective diameter of the inner race may be varied.

In testimony whereof, I hereunto affix my signature.

LEE B. GREEN.